(12) United States Patent
Tonkovich et al.

(10) Patent No.: US 6,488,838 B1
(45) Date of Patent: Dec. 3, 2002

(54) CHEMICAL REACTOR AND METHOD FOR GAS PHASE REACTANT CATALYTIC REACTIONS

(75) Inventors: Anna Lee Y. Tonkovich, Pasco; Yong Wang; Sean P. Fitzgerald, both of Richland; Jennifer L. Marco, Pasco; Gary L. Roberts, West Richland; David P. Vanderwiel; Robert S. Wegeng, both of Richland, all of WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 09/375,614

(22) Filed: Aug. 17, 1999

(51) Int. Cl.[7] .............................. C01B 3/26; C01B 3/16; C10G 47/02; C07C 5/00; C07C 17/00
(52) U.S. Cl. .................. 208/108; 208/143; 208/209; 252/373; 423/418.2; 423/437.2; 423/648.1; 423/651; 423/652; 423/656; 423/659; 568/924; 570/101; 570/123; 585/250; 585/654; 431/7
(58) Field of Search ................. 423/659, 648.1, 423/652, 653, 654, 651, 656; 208/108, 143, 209; 252/373; 431/7; 568/924; 570/101, 123; 585/250, 654, 418.2, 437.2

(56) References Cited

U.S. PATENT DOCUMENTS

| 5,366,719 A | * 11/1994 | Van Wingerden et al. .. 423/659 |
| 5,674,301 A | 10/1997 | Sakai ............................ 48/61 |

FOREIGN PATENT DOCUMENTS

| EP | 0 869 842 | 10/1998 | |
| EP | 0 689 842 | 10/2001 | ........................ 8/2 |
| JP | 6111838 | 4/1994 | |
| WO | WO 98/38147 | 9/1998 | ............. C07C/1/04 |

\* cited by examiner

Primary Examiner—Wayne A. Langel
(74) Attorney, Agent, or Firm—Stephen R. May; Frank S. Rosenberg

(57) ABSTRACT

The present invention is a chemical reactor and method for catalytic chemical reactions having gas phase reactants. The chemical reactor has reactor microchannels for flow of at least one reactant and at least one product, and a catalyst material wherein the at least one reactant contacts the catalyst material and reacts to form the at least one product. The improvement, according to the present invention is: the catalyst material is on a porous material having a porosity that resists bulk flow therethrough and permits molecular diffusion therein. The porous material further has a length, a width and a thickness, the porous material defining at least a portion of one wall of a bulk flow path through which the at least one reactant passes.

18 Claims, 3 Drawing Sheets

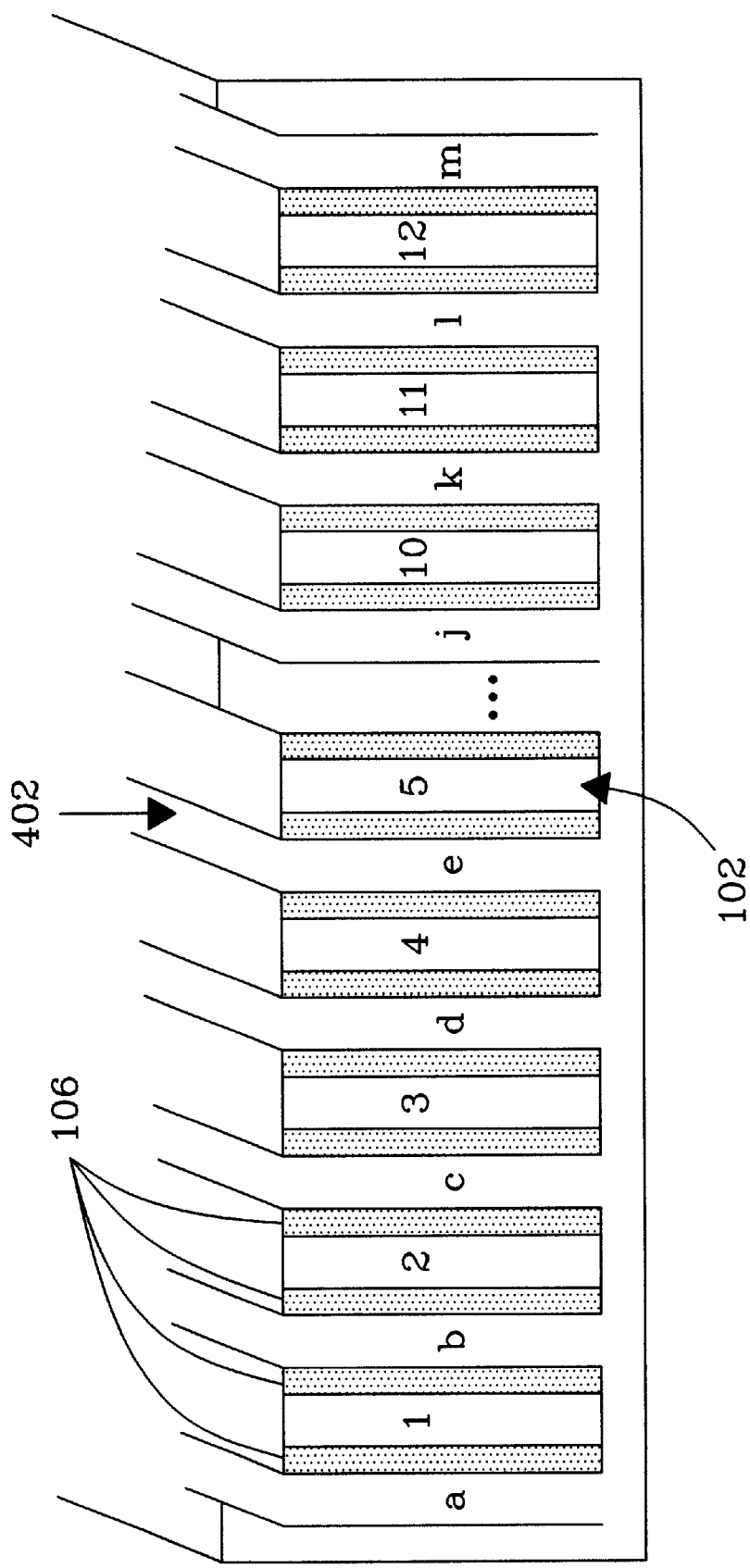

CHEMICAL REACTOR AND METHOD FOR GAS PHASE REACTANT CATALYTIC REACTIONS

FIELD OF THE INVENTION

The present invention is a chemical reactor and method for gas phase reactant catalytic reactions.

As used herein, the term "molecular diffusion" is used in its classic sense of the transfer of mass based upon Brownian motion between adjacent layers of fluid in laminar, transition, or turbulent flow, and includes transfer of mass between adjacent layers of fluid that are stagnant.

As used herein, the term "Knudsen diffusion" means Knudsen flow, or free molecule flow, wherein the mean free path of the molecules is long compared to a characteristic dimension of the flow field, for example the pore size of a material through which the molecules are diffusing.

BACKGROUND OF THE INVENTION

Many catalytic reactions begin with gas phase reactants, for example steam reforming, partial oxidation, water gas shift and others. However, equipment, specifically reactor volume is generally large because of mass and heat transfer limitations. Conventional reactors are operated with a gas hourly space velocity from about 1,000 to about 10,000 $hr^{-1}$. In other words, residence time is greater than 1 second because of the heat and mass transfer limitations.

These problems have been recognized and research is considering microchannel reactors because the microchannels have been shown to offer less resistance to heat and mass transfer thus creating the opportunity for dramatic reductions in process hardware volume. Several types of microchannel reactors have been described in the literature.

Franz et al., 1998 and Lowe et al., 1998 report applying a coating of the active catalyst (such as Pt, Ag, or other noble metal) directly to the microchannel wall. This approach has the disadvantage that the only usable surface area is that of the microchannel wall.

Weissmeier and Honicke, 1998a-b report creating a porous interface directly from the microchannel wall material onto which the catalyst is deposited. An aluminum wall was anodized to create the porous alumina interface that had an average pore diameter in the nanometer size range (permitting only Knudsen diffusion) and a thickness in the range of tens of microns. Disadvantages of this approach include that it is only applicable for aluminum, and limited surface area. The anodized walls formed a two-dimensional array of 700 identical microchannels.

Tonkovich/Zilka et al., 1998 reported packing catalytic powders directly within an array of parallel microchannels as a packed microbed. A disadvantage was a tendency to create relatively large pressure drops by forcing the fluid to flow through the packed microbed.

Tonkovich/Jimenez et al., 1998 reported placing a palladium catalyst supported on a metallic nickel foam within a cavity (more than an order of magnitude larger than a microchannel) and then sending the effluent to an array of microchannels to exchange heat. Again, a disadvantage was large pressure drop through the metal foam.

Hence, there is a need for a chemical reactor for catalytic reactions with fast kinetics that has a small reactor volume with a low pressure drop.

BACKGROUND REFERENCES

Franz, A. J., Quiram, D., Srinivasan, R., Hsing, I-M., Firebaugh, S. L., Jensen, K. F., and M. A. Schmidt, 1998, New Operating Regimes and Applications Feasible with Microreactors, Proceedings of the Second International Conference on Microreaction Technology, New Orleans, La., p 33–38.

Lowe, H., Ehrfeld, W., Gebauer, K., Golbig, K., Hausner, O., Haverkamp, V., Hessel, V., and Richter, Th., 1998, Microreactor Concepts for Heterogeneous Gas Phase Reactions, Proceedings of the Second International Conference of Microreaction Technology, March 1998, New Orleans, La., p. 63–74.

Tonkovich, A. Y., Zilka, J. L., Powell, M. R., and C. J. Call, 1998, The Catalytic Partial Oxidation of Methane in a Microchannel Chemical Reactor, Proceedings of the Second International Conference of Microreaction Technology, March 1998, New Orleans, La., p.45–53.

Tonkovich, A. Y., Jimenez, D. M., Zilka, J. L., LaMont, M., Wang, Y., and R. S. Wegeng, 1998, Microchannel Chemical Reactors for Fuel Processing, Proceedings of the Second International Conference of Microreaction Technology, March 1998, New Orleans, La., p.186–195.

Weissmeier, G., and Honicke, D., 1998a, Strategy for the Development of Micro Channel Reactors for Heterogeneously Catalyzed Reactions, Proceedings of the Second International Conference on Microreaction Technology, New Orleans, La., p. 24–32.

Weissmeier, G., and Honicke, D., 1998b, Microreaction Technology: Development of a microchannel reactor and its application in heterogeneously catalyzed hydrogenation, Proceedings of the Second International Conference on Microreaction Technology, New Orleans, La., p.152–153.

SUMMARY OF THE INVENTION

The present invention is a chemical reactor and method for catalytic chemical reactions having gas phase reactants. The chemical reactor has at least one reactor microchannel defining a bulk flow path through which at least one reactant passes, and at least one product, and a catalyst material wherein at least one reactant contacts the catalyst material and reacts to form at least one product. The improvement, according to the present invention is:

the catalyst material is in a porous structure having a porosity that permits molecular diffusion therein. The porous structure further has a length, a width and a thickness, the porous structure defining at least a portion of at least one wall of the at least one microchannel.

It is an object of the present invention to provide a chemical reactor for gas phase reactant catalytic reactions.

It is an object of the present invention to provide a method for gas phase reactant catalytic reactions.

A significant advantage of the present invention is the reduced pressure drop because the flow through the bulk flow path passes and contacts the porous structure but is not required to flow through the porous structure. Sufficient reaction still occurs because of the net flux through molecular diffusion into (gas phase reactant(s)) and out of (product (s)) the porous structure. Gas hourly space velocity is unexpectedly greater than 10,000 $hr^{-1}$ corresponding to residence time less than 1 second.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 7b is an end view of a microchannel reactor.

DESCRIPTION OF THE PREFERRED EMBODIMENT(S)

Figure 1:
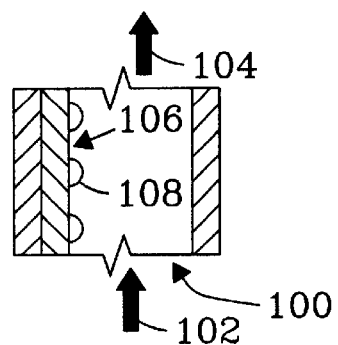
FIG. 1 is a cross section of a microchannel with a porous material therein.
Figure 2:
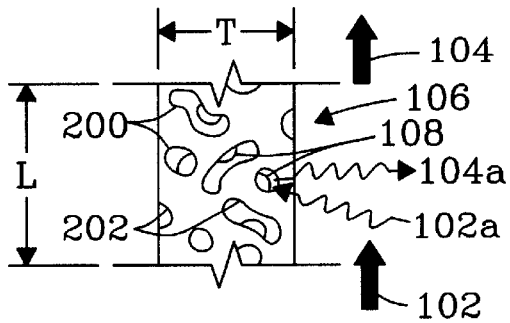
FIG. 2 is a cross section of the porous material with catalyst material thereon.

The present invention includes a chemical reactor for a catalytic chemical reaction with at least one gas phase reactant. The reactor (FIG. 1) has at least one reactor microchannel 100 for flow of at least one reactant 102 and at least one product 104. The improvement according to the present invention is that the reactor further has a porous structure 106 wherein the at least one reactant 102 reacts to form the at least one product 104. The porous structure 106 has pores 200 or porosity that resists bulk flow (reactant 102, product 104) therethrough and permits molecular diffusion (reactant portion 102a, product portion 104a) therein. The pores 200 are defined by porous surface area 202 upon which the catalyst material 108 resides. The porous material 106 further has a length L, a width (not shown) and a thickness T, and defines at least a portion of at least one wall of a bulk flow path through which the at least one reactant 102 passes.

A microchannel may be of any cross section defining the bulk flow path and is characterized by a characteristic dimension less than 1 mm.

In operation, the at least one reactant 102 enters the at least one reactor microchannel 100 in the bulk flow path, flowing past and in contact with the porous material 106. A portion of the at least one reactant 102a molecularly diffuses transversely into the porous catalyst 106 and reacts wherefrom the at least one product 104a molecularly diffuses transversely into the bulk flow path thereby transporting the at least one product 104 from the reactor.

Gas phase reactant catalytic reactions include but are not limited to steam reforming, $CO_2$ reforming partial oxidation, chlorination, fluorination, hydrogenation, dehydrogenation, nitration, water gas shift, reverse water gas shift, autothermal reforming, combustion, hydrocracking and hydrodesulferization. In steam reforming, gas hourly space velocity is greater than 10,000, preferably greater than 50,000, and may be about 100,000 corresponding to a residence time of less than 10 milliseconds.

In a preferred embodiment, the width of the bulk flow path is less than or equal to about 1 mm. The thickness T of the porous structure 106 is less than or equal to about 1 mm, and the length L preferably corresponds to a length of the microchannel of less than or equal to about 10 cm. The width of the porous structure 106 may vary but is at least about 20% and preferably at least about 50% of the circumference of the bulk flow path.

The porous material 106 may be a catalytic material, for example catalytic metal or ceramic in the form of a foam or a felt. Alternatively, the porous material 106 may be a porous support of a non-catalytic material with catalytic material 108 placed thereon. Porosity may be geometrically regular as in a honeycomb or parallel pore structure, or porosity may be geometrically tortuous or random. Porosity may range from about 30% to about 98% with average pore size less than the smallest microchannel dimension. Preferably pore size is from about 0.1 $\mu$m to about 200 $\mu$m permitting molecular diffusion.

Figure 3:
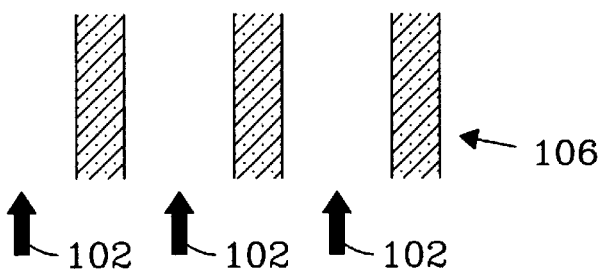
FIG. 3 is a cross section of microchannels defined by porous material.
Figure 4A:
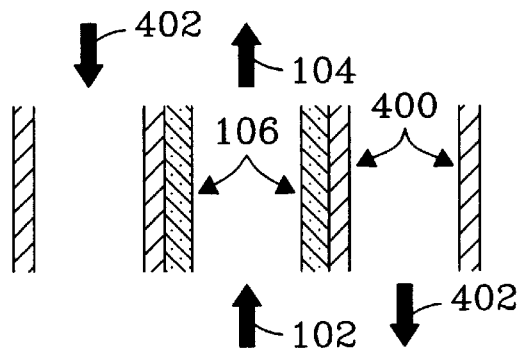
FIG. 4a is a cross section of a microchannel with porous material surrounded by heat transfer microchannels.
Figure 4B:
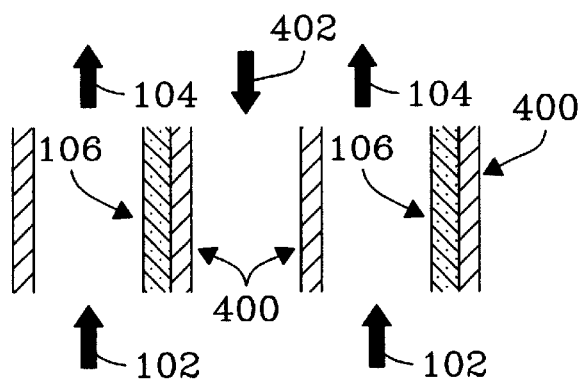
FIG. 4b is a cross section of microchannels with porous material with a heat transfer microchannel therebetween.

The porous material 106 alone may define the microchannels as in FIG. 3. In this embodiment, it is possible to use a heat transfer fluid provided that the porous material 106 thickness T is sufficient to prevent mixing of the at least one reactant 102 or at least one product 104 with the heat transfer fluid. Alternatively, products may diffuse through the porous material 106 into a secondary fluid (not shown) to be collected.

The porous material 106 may be placed adjacent a wall 400 of a non-porous material, for example metal, as in FIG.'s 4a, 4b as an insert that may be removable. The use of non-porous walls 400 permits the use of a heat transfer fluid 402 that is different from the at least one reactant 102 and/or the at least one product 104. The heat transfer fluid 402 may flow countercurrent, cocurrent, crosscurrent or combinations thereof in relationship to the at least one reactant 102 and/or the at least one product 104.

Figure 5:
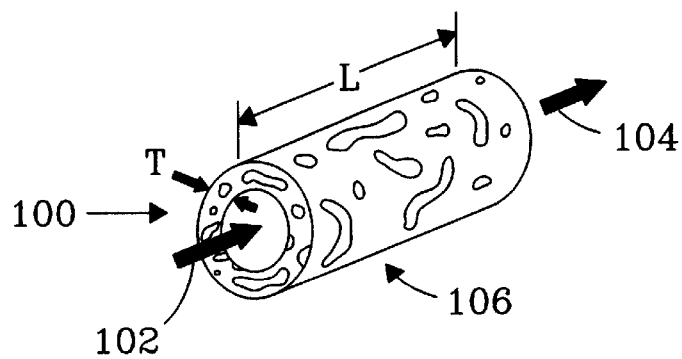
FIG. 5 is an isometric view of a cylindrical porous material.

The present invention includes cylindrical geometry as shown in FIG. 5. The inside diameter represents the microchannel and has a diameter of less than or equal to about 1 mm. The cylinder may be of any closed cross sectional shape. Multiple cylinders may be used. Cylinders may be formed as holes through a monolithic block of porous material 106. Alternate holes may be used for reactant/product and heat transfer fluid.

It is necessary that residence time of reactant(s) in the reactor be greater than the diffusion time for reactant(s) to contact the catalyst material. Pressure drop across the reactor preferably ranges from about 0.1 psi to about 5 psi.

Figure 6:
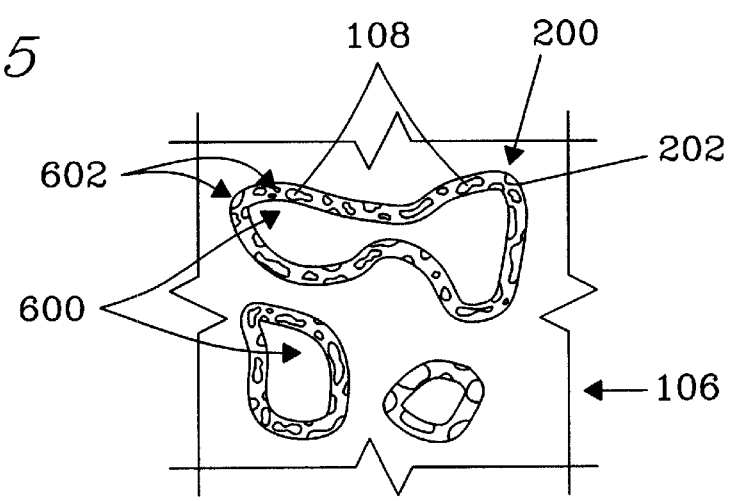
FIG. 6 is a cross section of the porous material with a second porous material on porous surface area.

Another embodiment is shown in FIG. 6 wherein the porous material 106 is a first porous material having a second porous material 600 on porosity surface area 202. The catalyst material 108 resides in the second pores 602. The second pores 602 are smaller than the pores 200, wherein the second pores 602 Knudsen diffusion occurs predominately.

EXAMPLE 1

An experiment was conducted to demonstrate the present invention using 1 microchannel for methane steam reforming. The microchannel was placed within a tube furnace to provide the required endothermic reaction heat. The microchannel was 1.52-cm long and 0.66-cm high. The width (or opening) of the microchannel was 0.0762-cm or 762-microns. The 0.0762-cm width included two porous structures that covered opposite walls and each had a width of 254-microns leaving a bulk flow path between the two porous structures of 254 microns. The porous structure contained a catalyst of 13.8%-Rh/6%-MgO/$Al_2O_3$ on a metal felt of stainless steel obtained from Technetics, Deland, Fla.

The methane inlet flowrate was 50.3-cc/min at standard conditions and the water (liquid) flowrate was 7.3 mL/hr, corresponding to a steam to carbon ratio of approximately 3:1. The methane and water were preheated to near the reaction temperature before entering the microchannel. Gas flow was in the bulk flow path between the porous structures had a Reynold's number less than about 500, and molecular diffusion brought reactants and products to and from each pore surface containing the catalyst.

Results are shown in Table E1-1 of performance as a function of temperature for very short residence times (less than 10-milliseconds).

TABLE 1-1

Performance data in single microchannel

| Temperature | Residence time (milliseconds) | Methane conversion (%) | CO selectivity (%) | Pressure drop (psi) |
|---|---|---|---|---|
| 650 | 2.3 | 54.2 | 42.3 | 0.05 |
| 700 | 2.2 | 70.9 | 50.9 | 0.13 |
| 800 | 2.0 | 88.9 | 65.4 | 0.45 |
| 900 | 1.8 | 89.6 | 74.6 | 1.00 |

EXAMPLE 2

Figure 7A:
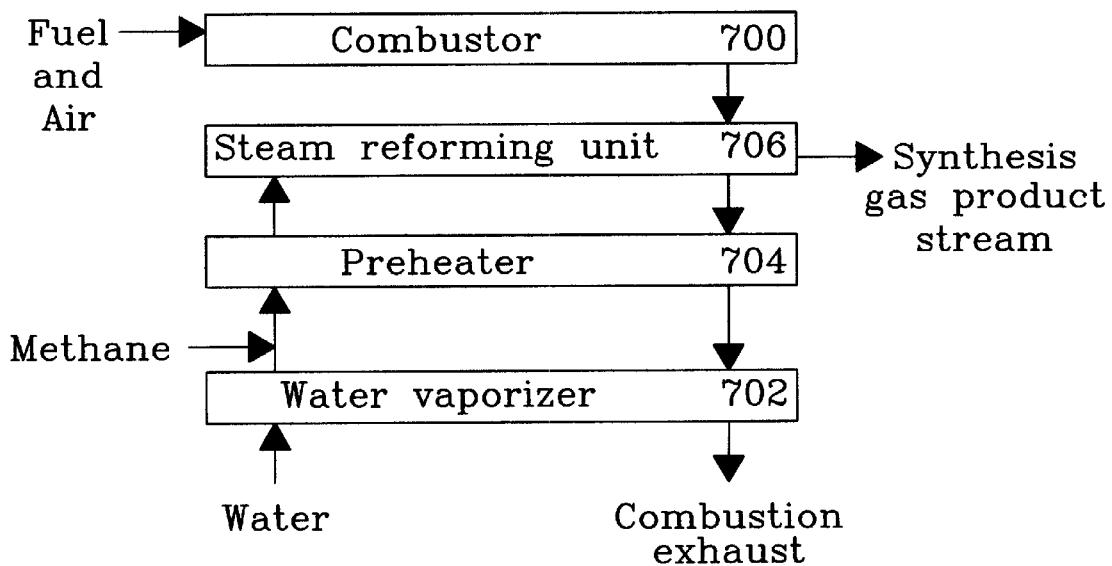
FIG. 7a is a block diagram of a microchannel steam reforming system.

An experiment was conducted to demonstrate the present invention. The apparatus (FIG. 7a) included a fuel combustor 700, water vaporizer 702, a reactant preheat heat exchanger 704, and a steam-reforming unit 706. The steam reforming unit 706 was constructed with 12 parallel channels (FIG. 7b) 1, 2, 3 . . . 12 each of length 2.79 cm, height 2.54 cm, and width of 750 microns. The porous structure 106 was felt metal of stainless steel with a porosity ranging from 35% to 90% obtained from Technetics, Orlando, Fla., having a width of about 250 micron. Pieces of metal felt with length and height nearly equal to the channel length and height were affixed to the walls on opposite sides of the channels leaving a bulk flow path of about 250 microns in each channel. The reactor microchannels were interspersed with heat exchange channels a, b, c. . . m to provide the endothermic reaction heat. The adjacent (and interleaved) parallel heat exchange microchannels (13 total) were hermetically sealed with respect to the reaction microchannels to prevent reactant by-pass around the catalyst material. The heat exchange microchannels had nearly the same height and length as the reaction microchannels. The width of each heat exchange channel was 508-microns. The heat exchange fluid 402 within the steam-reforming unit was the combustion product of hydrogen (20 SLPM feed) and excess air (168 SLPM feed). The combustion product 402 was fed in a cross-flow configuration to the direction of reactant flow 102.

Reactants were methane and water in the form of steam at flow rates of 1 SLPM and 2.81-SLPM (or 2.26-ml/min liquid) respectively. Gas hourly space velocity was approximately 100,000 $hr^{-1}$ corresponding to a residence time of 9.2 milliseconds. Reactor inlet temperature was 736° C. receiving a mixture of methane and steam. The pressure drop through the microchannel steam-reforming unit was less than 0.6 psi.

Product conversion of methane was 79% and selectivity to CO was 65%.

Closure

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method of conducting a catalytic chemical reaction in a reactor, with at least one gas phase reactant, said method having the steps of flowing said at least one gas phase reactant past a catalyst material and reacting said at least one gas phase reactant to form at least one product; wherein the improvement comprises:
    (a) providing said catalyst material as a porous structure having a porosity that permits molecular diffusion therein, said porous structure further having a length, a width and a thickness, said porous structure defining at least a portion of at least one wall of a microchannel defining a bulk flow path through which said at least one reactant passes;
    (b) flowing said at least one gas phase reactant through said microchannel, past and in contact with said porous structure containing said catalyst material, a portion of said at least one gas phase reactant molecularly diffusing transversely into said porous structure and reacting therein wherefrom said at least one product molecularly diffuses transversely into said bulk flow path, and transporting said at least one product from a reactor.

2. The method as recited in claim 1, wherein said catalytic reaction is selected from the group consisting of steam reforming, $CO_2$ reforming, partial oxidation, chlorination, fluorination, hydrogenation, dehydrogenation, nitration, water gas shift, reverse water gas shift, autothermal reforming, combustion, hydrocracking and hydrodesulferization.

3. The method as recited in claim 1, wherein a gas hourly space velocity is greater than 10,000 corresponding to a residence time less than 1 second.

4. The method as recited in claim 1, further comprising at least one heat transfer microchannel adjacent said reactor microchannel.

5. The method of claim 4 wherein a heat transfer fluid flows in a cross-current relationship to the at least one gas phase reactant.

6. The method of claim 1 wherein the porous structure has geometrically regular porosity.

7. The method of claim 6 wherein the geometrically regular porosity is formed by a honeycomb or parallel pore structure.

8. The method of claim 1 wherein the porous structure is in the form of a felt.

9. The method of claim 1 wherein the porous structure has a pore size of from about 0.1 $\mu$m to about 200 $\mu$m.

10. The method of claim 1 wherein the step of providing said catalyst material as a porous structure comprises placing a removable insert adjacent a wall of a nonporous material.

11. The method of claim 1 wherein pressure drop across the reactor ranges from about 0.1 psi to about 5 psi.

12. The method of claim 3 wherein pressure drop across the reactor ranges from about 0.1 psi to about 5 psi.

13. A method of conducting a catalytic chemical reaction with at least one gas phase reactant, comprising:
    (a) providing a catalyst material as a porous structure-having a porosity that permits molecular diffusion therein, said porous structure further having a length, a width and a thickness, said porous structure defining at least a portion of at least one wall of a microchannel defining a bulk flow path through which said at least one reactant passes;

(b) flowing said at least one gas phase reactant through said microchannel, past and in contact with said porous structure containing said catalyst material, a portion of said at least one gas phase reactant molecularly diffusing transversely into said porous structure and reacting therein to form at least one product, wherefrom said at least one product molecularly diffuses transversely into a secondary fluid, and collecting said at least one product.

14. The method as recited in claim 13, wherein said catalytic reaction is selected from the group consisting of steam reforming, $CO_2$ reforming, partial oxidation, chlorination, fluorination, hydrogenation, dehydrogenation, nitration, water gas shift, reverse water gas shift, autothermal reforming, combustion, hydrocracking and hydrodesulferization.

15. The method of claim 13 wherein the porous structure has geometrically regular porosity.

16. The method of claim 15 wherein the geometrically regular porosity is formed by a honeycomb or parallel pore structure.

17. The method of claim 13 wherein the porous structure is in the form of a felt.

18. The method of claim 13 wherein the porous structure has a pore size of from about 0.1 $\mu$m to about 200 $\mu$m.

* * * * *

(12) EX PARTE REEXAMINATION CERTIFICATE (9241st)
United States Patent
Tonkovich et al.

(10) Number: US 6,488,838 C1
(45) Certificate Issued: Aug. 28, 2012

(54) CHEMICAL REACTOR AND METHOD FOR GAS PHASE REACTANT CATALYTIC REACTIONS

(75) Inventors: Anna Lee Y. Tonkovich, Pasco, WA (US); Yong Wang, Richland, WA (US); Sean P. Fitzgerald, Richland, WA (US); Jennifer L. Marco, Pasco, WA (US); Gary L. Roberts, West Richland, WA (US); David P. Vanderwiel, Richland, WA (US); Robert S. Wegeng, Richland, WA (US)

(73) Assignee: Battelle Memorial Institute K1-53, Richland, WA (US)

Reexamination Request:
No. 90/011,279, Oct. 11, 2010

Reexamination Certificate for:
Patent No.: 6,488,838
Issued: Dec. 3, 2002
Appl. No.: 09/375,614
Filed: Aug. 17, 1999

(51) Int. Cl.
*B01J 19/00* (2006.01)
*B01J 12/00* (2006.01)
*C01B 13/02* (2006.01)
*C01B 3/38* (2006.01)
*C01B 3/50* (2006.01)
*C01B 3/00* (2006.01)

(52) U.S. Cl. .......... 208/108; 208/143; 208/209; 252/373; 423/418.2; 423/437.2; 423/648.1; 423/651; 423/652; 423/656; 423/659; 568/924; 570/101; 570/123; 585/250; 585/654; 431/7

(58) Field of Classification Search .......... 208/108
See application file for complete search history.

(56) References Cited

To view the complete listing of prior art documents cited during the proceeding for Reexamination Control Number 90/011,279, please refer to the USPTO's public Patent Application Information Retrieval (PAIR) system under the Display References tab.

*Primary Examiner* — Elizabeth L. McKane

(57) ABSTRACT

The present invention is a chemical reactor and method for catalytic chemical reactions having gas phase reactants. The chemical reactor has reactor microchannels for flow of at least one reactant and at least one product, and a catalyst material wherein the at least one reactant contacts the catalyst material and reacts to form the at least one product. The improvement, according to the present invention is: the catalyst material is on a porous material having a porosity that resists bulk flow therethrough and permits molecular diffusion therein. The porous material further has a length, a width and a thickness, the porous material defining at least a portion of one wall of a bulk flow path through which the at least one reactant passes.

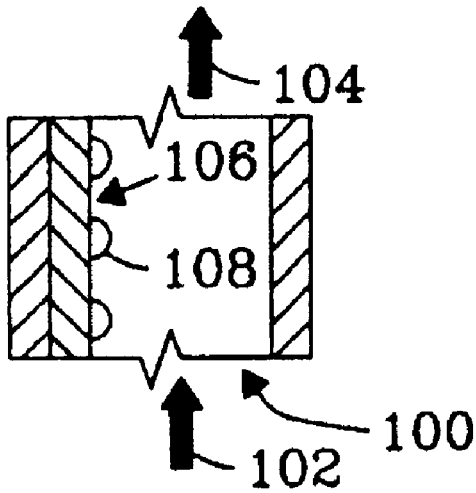

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-18 is confirmed.

New claims 19-34 are added and determined to be patentable.

*19. The method of claim 1 wherein the catalyst material has a porosity of from 30% to 98%.*

*20. The method of claim 9 wherein the catalyst material has a porosity of from 30% to 98%.*

*21. The method of claim 13 wherein the catalyst material has a porosity of from 30% to 98%.*

*22. The method of claim 18 wherein the catalyst material has a porosity of from 30% to 98%.*

*23. A method of conducting a catalytic chemical reaction in a reactor, with at least one gas phase reactant, said method having the steps of flowing said at least one gas phase reactant past a catalyst material and reacting said at least one gas phase reactant to form at least one product; wherein the improvement comprises:*

*(a) providing said catalyst material as a porous structure having a porosity that permits molecular diffusion therein, said porous structure further having a length, a width and a thickness, said porous structure defining at least a portion of at least one wall of a microchannel defining a bulk flow path through which said at least one reactant passes;*

*(b) flowing said at least one gas phase reactant through said microchannel, past and in contact with said porous structure containing said catalyst material, a portion of said at least one gas phase reactant molecularly diffusing transversely into said porous structure and reacting therein wherefrom said at least one product molecularly diffuses transversely into said bulk flow path, and transporting said at least one product from a reactor;*

*wherein said catalytic reaction is selected from the group consisting of steam reforming, $CO_2$ reforming, chlorination, fluorination, hydrogenation, dehydrogenation, nitration, water gas shift, reverse water gas shift, autothermal reforming, hydrocracking and hydrodesulferization.*

*24. The method of claim 23 wherein the catalyst material has a porosity of from 30% to 98%.*

*25. The method of claim 23 wherein the catalytic reaction is steam reforming and the gas hourly space velocity is greater than 10,000.*

*26. A method of conducting a catalytic chemical reaction in a reactor, with at least one gas phase reactant, said method having the steps of flowing said at least one gas phase reactant past a catalyst material and reacting said at least one gas phase reactant to form at least one product; wherein the improvement comprises:*

*(a) providing said catalyst material as a porous structure adjacent a nonporous wall, the catalyst material having a porosity that permits molecular diffusion therein, said porous structure further having a length, a width and a thickness, said porous structure defining at least a portion of at least one wall of a microchannel defining a bulk flow path through which said at least one reactant passes;*

*(b) flowing said at least one gas phase reactant through said microchannel, past and in contact with said porous structure containing said catalyst material, a portion of said at least one gas phase reactant molecularly diffusing transversely into said porous structure and reacting therein wherefrom said at least one product molecularly diffuses transversely into said bulk flow path, and transporting said at least one product from a reactor.*

*27. The method of claim 26 wherein the catalyst material has a porosity of from 30% to 98%.*

*28. A method of conducting a catalytic chemical reaction in a reactor, with at least one gas phase reactant, said method having the steps of flowing said at least one gas phase reactant past a catalyst material and reacting said at least one gas phase reactant to form at least one product; wherein the improvement comprises:*

*(a) providing said catalyst material as a porous structure having a porosity that permits molecular diffusion therein, said porous structure further having a length, a width and a thickness, said porous structure defining at least a portion of at least one wall of a microchannel defining a bulk flow path through which said at least one reactant passes;*

*(b) flowing said at least one gas phase reactant through said microchannel, past and in contact with said porous structure containing said catalyst material, a portion of said at least one gas phase reactant molecularly diffusing transversely into said porous structure and reacting therein wherefrom said at least one product molecularly diffuses transversely into said bulk flow path, and transporting said at least one product from a reactor; and*

*flowing a heat transfer fluid flowing in a heat exchange channel adjacent to said microchannel and exchanging heat between the heat exchange fluid and said catalyst material.*

*29. The method of claim 28 wherein the catalyst material has a porosity of from 30% to 98%.*

*30. The method of claim 28 wherein there are a plurality of said microchannels interspersed with a plurality of heat exchange channels.*

*31. The method of claim 1 wherein the reactor comprises a plurality of parallel channels, said parallel channels comprising walls composed of a nonporous material.*

*32. The method of claim 31 wherein said parallel channels comprise said catalyst material as an insert adjacent a wall of the nonporous material.*

*33. The method of claim 19 wherein the reactor comprises a plurality of parallel channels, said parallel channels comprising walls composed of a nonporous material.*

*34. The method of claim 1 wherein said porous structure comprises a first porous material having a second porous material deposited thereon wherein the second porous material comprises pores in which Knudsen diffusion occurs predominately.*

* * * * *